United States Patent [19]

Solleder

[11] Patent Number: 4,615,538
[45] Date of Patent: Oct. 7, 1986

[54] ELASTICALLY FLEXIBLE PIVOT BEARING FOR MUTUAL PIVOTABLE CONNECTION OF PARTS OF A MOTOR VEHICLE

[75] Inventor: Otto Solleder, Leutenbach, Fed. Rep. of Germany

[73] Assignee: Daimler-Benz Aktiengesellschaft, Fed. Rep. of Germany

[21] Appl. No.: 467,338

[22] Filed: Feb. 17, 1983

[30] Foreign Application Priority Data

Feb. 18, 1982 [DE] Fed. Rep. of Germany ....... 3205716

[51] Int. Cl.$^4$ .............................................. B60G 3/00
[52] U.S. Cl. ................................. 280/690; 267/140.3; 384/295
[58] Field of Search .................. 301/124 R, 126, 5.3, 301/5.7, 105 R, 125; 384/276, 297, 299, 295; 280/673, 675, 690; 267/140.3, 140.4; 403/161–163

[56] References Cited

U.S. PATENT DOCUMENTS

| | | | |
|---|---|---|---|
| 399,393 | 3/1889 | Failer | 301/126 |
| 760,505 | 5/1904 | Wilcox | 301/126 |
| 2,021,035 | 11/1935 | Vogt | 301/5.3 |
| 3,573,882 | 4/1971 | Van Winsen | 280/690 |
| 4,078,276 | 3/1978 | Nunes | 403/161 |
| 4,435,100 | 3/1984 | Cox | 384/276 |

FOREIGN PATENT DOCUMENTS

| | | | |
|---|---|---|---|
| 1102577 | 3/1961 | Fed. Rep. of Germany | 280/673 |
| 2623870 | 12/1977 | Fed. Rep. of Germany | |
| 1159205 | 6/1958 | France | 280/673 |
| 662251 | 12/1951 | United Kingdom | 280/673 |

OTHER PUBLICATIONS

German Ref., "Fahrwerktechnik 1", by Reimpell, p. 398, picture 3.9/2.

Primary Examiner—David A. Scherbel
Assistant Examiner—Dennis C. Rodgers
Attorney, Agent, or Firm—Craig & Burns

[57] ABSTRACT

A flexible bearing connects a wheel carrier of a motor vehicle to a wheel guide member and possesses a cylindrical screw bolt which is retained on the wheel carrier and extends freely away from the bearing, the bolt carrying a bearing body which is shock-absorbing in a radial direction and which receives the wheel guide member. The bearing body is attached by means of a cylindrical bore of an inner sleeve onto a radially prestressed metal sleeve which is slotted over its entire length, the sleeve being arranged on the screw bolt with a slight radial play and which projects into a cylindrical bore in the wheel carrier receiving the screw bolt. When the screw bolt is in the tensioned state, the inner sleeve of the bearing body rests frictionally by means of one of its end faces against a bearing face of the wheel carrier carrying the screw bolt. The metal sleeve forms a resilient intermediate member and is located between the inner sleeve and the screw bolt. The radial play existing between the metal sleeve and the screw bolt causes the sleeve to be capable of proportionally absorbing a bending moment thereby reducing load on the bolt screw. Accordingly, the screw bolt can have a smaller cross-section, with attendant greater elasticity.

5 Claims, 1 Drawing Figure

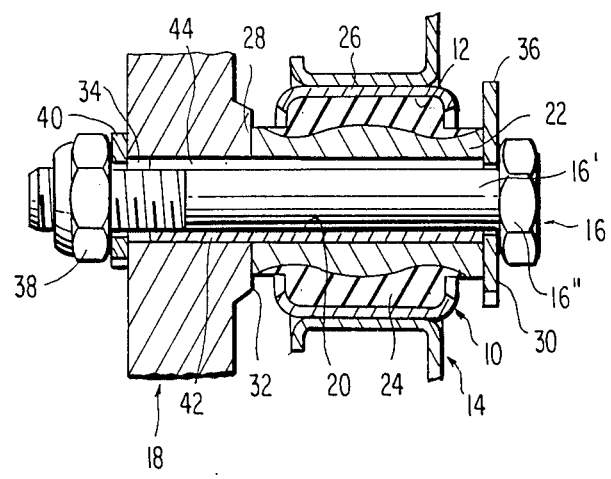

ELASTICALLY FLEXIBLE PIVOT BEARING FOR MUTUAL PIVOTABLE CONNECTION OF PARTS OF A MOTOR VEHICLE

TECHNICAL FIELD

This invention relates to an elastically flexible pivot bearing for the mutual pivotable connection of a supporting part and a pivotable part of a motor vehicle.

More specifically, the invention relates to connection of a wheel carrier to a wheel guide member with a screw bolt. It penetrates by means of one shank end through a cylindrical recess in the supporting part and extends freely away from this part. The bolt is retained in the supporting part as a result of axial tensioning and with a bearing body arranged by means of an inner sleeve on the isolated part of the screw bolt and receiving the pivotable part. When the screw bolt is in the tensioned state, the inner sleeve rests under pressure by means of its end faces against corresponding opposing faces, at least one of which is provided on the supporting part.

BACKGROUND ART

In known pivot bearings of the type described above, the inner sleeve of the bearing body sits directly on the screw bolt and rests frictionally by means of one of its end faces against a bearing face of the part supporting the screw bolt. (See Fahrwerktechnik [Running gear technology]I, by Reimpell, page 398, FIG. 3.9/2).

SUMMARY OF THE INVENTION

In this invention, the screw bolt is arranged with radial play centrally in the inner sleeve of the bearing body and in the cylindrical recess in the wheel carrier holding the bolt. On the one hand, the total bending moment is introduced half as a bending moment by the screw bolt into the part holding it. On the other hand, the bending moment is half supported as a longitudinal force in the screw bolt and against the bearing face of the wheel carrier. The transverse force is then transmitted by means of a frictional connection.

However, when the screw bolt rests against the shell surface of the inner sleeve and the cylindrical recess, the screw bolt is subjected to greater bending stress. This resulting force is introduced into the screw bolt no longer solely by the end face of the inner sleeve, but also partially by the contact face between the periphery of the screw bolt and the periphery of the inner-sleeve bore.

In the event of alternating forces, the transverse force is also transmitted by means of a frictional connection.

At the same time, the cross-sections of the screw bolt and inner sleeve must be given appropriately large dimensions so that the stresses arising cannot lead to overloading. However, large cross-sections result in a high degree of rigidity and correspondingly small deformations.

The object of this invention is, therefore, in pivot bearings of the type described above to considerably reduce the influence of the forces which act on the components of the pivot mounting serving for absorbing the forces. Another object is to bring about a more elastic absorption of shocks for the purpose of reducing, in the pivot mounting, stresses arising from the shocks.

This object is achieved, according to the invention, because a metal sleeve is located in a conventional way between the inner sleeve of the bearing body and the screw bolt. The sleeve is slotted over its entire length and is retained with radial prestressing in the inner sleeve. The sleeve projects into the cylindrical recess of the supporting part. The object of the present invention is also achieved because the metal sleeve is arranged with radial play on the screw bolt, and because the inner sleeve is clamped between the supporting part and the head or a threaded nut of the screw bolt.

In the pivot bearing of the present invention, the metal sleeve, engaging by means of one end piece into the supporting part, forms a resilient intermediate member. It is located between the inner sleeve and the screw bolt and is capable of proportionally absorbing a bending moment because of the radial play existing between the member and the screw bolt.

The screw bolt is therefore subjected to bending only when the bending resistance produced by the metal sleeve is overcome. Up to this moment, the screw bolt is subjected exclusively to tensile stresses.

The proportionate absorption of bending moments by the metal sleeve therefore makes it possible to select a smaller cross-section of the screw bolt. This imparts greater elasticity to the bolt. Under normal use, the transverse forces directed perpendicularly to the axis of the bearing shank are transmitted exclusively by means of the frictional connection between the inner sleeve of the bearing body and the bearing face of the part supporting the screw bolt. Thus, the clamping sleeve and the screw bolt together form a bearing shank for the bearing body. The two parts absorb radially directed forces. Specifically, the metal sleeve absorbs those forces earlier than the screw bolt because of the radial play between these parts.

The metal sleeve also affords the advantage that it maintains for a relatively long time the frictional connection between the inner sleeve and the bearing body and the bearing face when substantial or sudden shocks occur. This is because of its elasticity, by means of which it is capable of absorbing the bending moment proportionally and correspondingly relieving the screw bolt. At the same time, the longitudinal or tensile force activated in the screw bolt is kept correspondingly small because it bends. Therefore, the loss of pressing force for the frictional connection is also kept small.

Another advantage of the invention is that a greater permissible deformation distance is made possible by the metal sleeve bringing about an effective reduction in impact forces. In the pivot mounting according to the invention, a longer deformation distance is available for the reduction of impact energy compared with known pivot mountings. The relative movements arising between the metal sleeve, the inner sleeve of the bearing body and, for example, a wheel carrier supporting the screw bolt, generate friction on the peripheral walls of the recesses receiving the metal sleeve. This occurs because the metal sleeve rests with radial prestressing against the peripheral walls. This causes impact energy to be dampened and therefore leads to a damping effect, as a result of which the vibration energy is converted into heat and vibrations are thereby dissipated. This contributes to improving the driving effort of motor vehicles and to less loading of other components.

A further advantage of the construction according to the invention arises from the radial flexibility of the prestressed metal sleeve. This occurs because the metal sleeve adapts itself to the peripheral shape of the recesses receiving it. Forces are thereby transmitted over a larger area. As a result, such pronounced deformations due to surface pressure as occur in a radially rigid sleeve do not arise on the edges of the recesses adjacent to one another. Nevertheless, it is still considered as coming under the invention to have also a pivot mounting in which, instead of the slotted metal sleeve, there is a sleeve closed on the periphery or radially rigid or only partially slotted along a generating line. This is achieved because the sleeve is a relatively thin-walled sleeve which is pressed with an appropriate fit into the inner sleeve of the bearing body and the recess in the part holding the screw bolt. This sleeve is also capable of proportionally absorbing the bending moment.

Because of the division and transmission of transverse forces and bending moments, brought about according to the invention, a substantial increase in the strength in time or the fatigue strength is obtained for the individual components of the pivot mounting. Thus, there is a possibility of producing these components from less high-strength materials.

A further important advantage of the invention is that it enables the screw bolt to be secured to prevent loosening or to maintain the prestressing of the screw bolt. This is achieved by very largely preventing relative moments between the screw head and the inner sleeve or screw nut and the part holding the screw bolt. At the same time, the metal sleeve limits the deformation distance as a result of proportionate absorption of the bending moment or of the transverse force on the bearing face of the inner sleeve, for example on a wheel carrier, insofar as the frictional connection may have been overcome.

As a result of the relieving effect of the metal sleeve, the diameter of the screw bolt can be kept correspondingly small (low moment of inertia). The screw bolt is capable of participating in deformations which occur. The static friction remains because the screw head or the screw nut always rest against the connecting parts.

A metal sleeve which is suitable in an especially advantageous way is a clamping sleeve made of steel which is slotted along a generating line. When not installed, it has an outside diameter greater than the inside diameter of the recesses receiving it, so that it is retained with a press fit. Clamping sleeves according to DIN 7346 (light-weight design) and according to DIN 1481 (heavy-duty design) can be used here.

These and other objects, features and advantages of the present invention will become more apparent from the following description when taken in connection with the accompanying drawing which shows, for purposes of illustration only, one embodiment in accordance with the present invention.

BRIEF DESCRIPTION OF THE DRAWING

The invention is explained in more detail below with reference to an exemplary embodiment illustrated diagrammatically in the drawing.

DESCRIPTION OF THE INVENTION

The elastically flexible pivot mounting illustrated in the drawing as an exemplary embodiment of the invention is a mounting intended for the pivotable connection of a wheel guide member to a wheel carrier.

In the pivot mounting illustrated in longitudinal section, 10 denotes a bearing body of the mounting, which is arranged with a press fit in a cylindrical recess 12 in the wheel guide member denoted by 14.

The bearing body 10 is fixed laterally to a wheel carrier 18 by means of a screw bolt 16.

The bearing body 10 has an inner sleeve 22 through which a cylindrical bore 20 passes in an axial direction. On the outer periphery of the inner sleeve, for example, a rubber body 24 is attached, preferably by vulcanization. An outer sleeve 26, coaxial with the inner sleeve, is preferably vulcanized onto the outer periphery of this rubber body and is retained with a press fit in the recess 12 in the wheel guide member 14.

The rubber body could also be loosely attached to the inner sleeve 22. This could be achieved with clamping means for mutual elastic connection of the wheel guide member 14 to the inner sleeve 22, to brace the rubber body in a radial direction between these parts. Likewise, an oversized rubber body could be compressed between the inner sleeve and the outer sleeve.

The inner sleeve 22 has two plane-parallel end faces 28 and 30. By means of the screw bolt 16, the bearing body 10 is frictionally fixed by means of the end face 28 of its inner sleeve 22 against a bearing face 32 of the wheel carrier 18. The screw bolt 16 is preferably a cylindrical hexagonal shank screw. For this purpose, the wheel carrier 18 is equipped with a cylindrical bore 34. The bore passes through the wheel carrier near the bearing face 32. The screw shank 16' is guided through the bore by its shank end piece. It has an external thread.

A washer 36 is attached to the screw shank. The washer is located between the end face 30 of the inner sleeve 22 of the bearing body and the screw head 16''.

A threaded nut 38 braces the bearing body 10 on the wheel carrier 18. The nut 38 is screwed onto the shaft end piece projecting from the wheel carrier 18. Preferably, a washer 40 rests against the wheel carrier 18 and the nut 38.

As may be seen from the drawing, the inside diameters of the cylindrical bores 20, 34 of the inner sleeve 22 and the wheel carrier 18 are greater than the outside diameter of the cylindrical screw shank 16'. It is thereby possible to provide, between the inner sleeve 22 of the bearing body 10 or the inner periphery of the cylindrical bore 34 of the wheel carrier 18 and the screw shank 16' of the screw bolt 16, a cylindrical intermediate member in the form of a cylindrical steel sleeve 42. This sleeve 42 is attached to the screw shank 16', so that it is retained with a radial prestress in the cylindrical bores 20, 34. The screw shank 16' is retained in these with slight radial play. For this purpose, the steel sleeve 42 is preferably formed by a clamping sleeve of appropriate dimensions which has a slot 44 over its entire length. The slot 44 extends through the entire inner sleeve 22 and into the bore 34 of the wheel carrier 18. The slot 44 ends at a distance from the washer 40 in the bore 34. When not installed, the slotted clamping sleeve 42 has a larger outside diameter than the bores 20, 34, so that it is retained with a press fit in the inner sleeve 22 of the bearing body 10 and in the wheel carrier 18. When the screw bolt 16 is in the tensioned state, transverse forces acting on the wheel guide member 14 are transmitted to the wheel carrier 18 as a result of a frictional connection between the faces 28, 32 of the inner sleeve 22 of the bearing body 10 and the wheel carrier 18. At the same time, because of its elasticity, the clamping sleeve 42 is capable of partially absorbing transverse forces, so that, for example, in the event of heavy sharp shocks, the frictional connection is maintained for a correspondingly long period. Likewise, bending moments which take effect are absorbed proportionally by the clamping sleeve 42, so that the screw bolt 16 is subjected to a correspondingly lower bending moment. The reduction in the bending moment on the screw bolt 16 ensures that the longitudinal forces arising as a result of bending stresses in the screw bolt 16 are correspondingly reduced.

During the absorption of bending moments, relative moments generating friction take place between the wheel carrier 18, the clamping sleeve 42 and the inner sleeve 22 of the bearing body 10. The result is that impact energy is dissipated and a damping effect is achieved.

Moreover, the arrangement of the longitudinally slotted clamping sleeve 42 provides convenient corrosion protection for the screw shank 16' of the screw bolt 16 and allows coarser tolerances in the production of the bores 20, 34. Instead of a clamping sleeve made of steel, the sleeve 42 could also be made of another metal, especially aluminum. The bearing body 10 could also be made radially rigid and form, for example, a ball-and-socket joint. The materials used to fabricate the components of the pivot bearing of the present invention are conventional.

While I have shown and described one embodiment in accordance with the present invention, it is understood that the same is not limited thereto but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. An elastically flexible bearing comprising;
   a supporting part means with at least one aperture and a bearing face,
   a pivotable part means,
   a screw bolt means having an axis and a shank end for penetrating the pivotable part means and the aperture and extending away from the supporting part means in a cantilever beam fashion, and being retained in the supporting part means by tension along said axis,
   a bearing body comprising
   an inner sleeve encompassing the screw bolt means for receiving the pivotable part means, and clamped between the screw bolt means and the supporting part means when the screw bolt means is under tension, the inner sleeve having an end face clamped against the bearing face,
   a metal sleeve means slotted over substantially its entire length surrounding the screw bolt means with radial play therebetween, and being retained with radial prestressing in the inner sleeve and supporting part means.

2. The pivot mounting according to claim 1, wherein the metal sleeve is formed by a clamping sleeve.

3. The pivot bearing according to claim 1, wherein the support means is a wheel carrier and the pivotable part means is a wheel guide member.

4. The pivot mounting according to claim 1, wherein the metal sleeve is a steel sleeve.

5. An elastically flexible bearing comprising;
   a wheel carrier means with at least one aperture and a bearing face,
   a wheel guide member,
   means maintaining a frictional connection to transmit transverse force from the wheel guide member to the wheel carrier for dissipating impact energy, said means comprising
   a screw bolt means having an axis and a shank end for penetrating the wheel guide member and the aperture and extending away from the wheel carrier means in a cantilever fashion, and being retained in the wheel carrier means by tension along said axis, an inner sleeve encompassing the screw bolt means for receiving the pivotable part means, and clamped between the screw bolt means and the supporting part means when the screw bolt means is under tension, the inner sleeve having an end face which is clamped against the bearing face, a metal sleeve means slotted over substantially its entire length surrounding the screw bolt means with radial play therebetween and retained with radial prestressing in the inner sleeve and wheel carrier means for extending the permissible deformation distance between wheel carrier and wheel guide member to absorb bending moments and for reducing longitudinal forces carried by the screw bolt means.

* * * * *